United States Patent [19]

Murase

[11] Patent Number: 5,581,855
[45] Date of Patent: Dec. 10, 1996

[54] HOOK FASTENER FOR CONNECTING A BELT

[75] Inventor: Mikio Murase, Osaka-fu, Japan

[73] Assignee: Osaka Trunk Material Co., Ltd., Osaka-fu, Japan

[21] Appl. No.: 456,467

[22] Filed: Jun. 1, 1995

[30] Foreign Application Priority Data

Dec. 8, 1994 [JP] Japan .................................. 6-331817

[51] Int. Cl.⁶ .................................................. A44B 13/00
[52] U.S. Cl. .................................... 24/600.5; 24/599.6
[58] Field of Search ................... 24/600.5, 600.6, 24/600.7, 600.8, 599.6, 601.4, 338, 331, 498, 3.6, 68 CD

[56] References Cited

U.S. PATENT DOCUMENTS

| | | | |
|---|---|---|---|
| 48,100 | 6/1865 | Saladee | 24/599.6 |
| 302,028 | 7/1884 | Raymond | 24/599.6 |
| 426,498 | 4/1890 | Hale | 24/599.6 |
| 493,300 | 3/1893 | Ross | 24/599.8 |
| 1,392,715 | 10/1921 | Sommer | 24/3.6 |
| 1,709,235 | 4/1929 | Shaffer | 24/599.7 |
| 2,581,825 | 1/1952 | Ah Fong Lau Ah You | 24/3.6 |

FOREIGN PATENT DOCUMENTS 0322899  2/1903  France ................................. 24/599.6

Primary Examiner—Victor N. Sakran
Attorney, Agent, or Firm—Lowe, Price, LeBlanc & Becker

[57] ABSTRACT

A ball-hook fastener for connecting a belt to a bag has a hook body having a turned portion, a ball housed in a hole formed in the hook body, and a leaf spring for supporting the ball. The hole is formed in a base portion of the hook body. The leaf spring is fixed to a back of the hook body and has a recessed portion for rotatably supporting the ball at a free end thereof.

10 Claims, 8 Drawing Sheets

PRIOR ART

HOOK FASTENER FOR CONNECTING A BELT

FIELD OF THE INVENTION

The present invention relates to a hook fastener or ball-hook fastener for connecting a belt, such as a shoulder belt of a shoulder bag, back belts of rucksack or knapsack, a sling of a camera or video camera, a waist belt for trousers, a wrist belt for wrist watch or another type belts, and a connecting device having the fastener.

BACKGROUND OF THE RELATED ART

Figure 10:
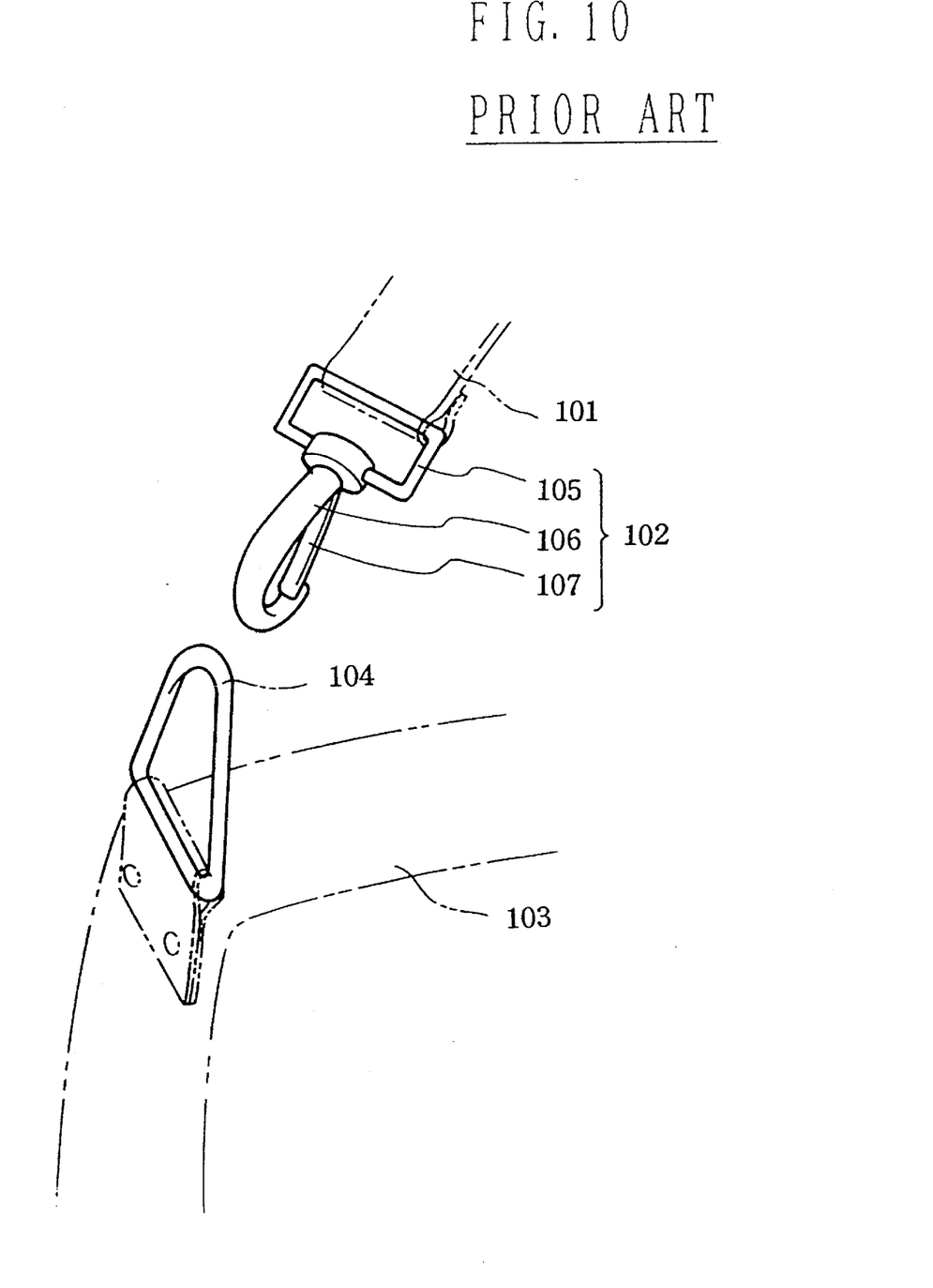
FIG. 10 is a schematic perspective view showing an example of a conventional type of hook fastener.

Until now, there had been known a shoulder bag which has not only a detachable shoulder belt but also a grip. The shoulder bag is used as a brief-case or a grip-sack when the shoulder belt is detached, and is used as a shoulder bag when the shoulder belt is attached. Such shoulder belt for a shoulder bag is usually fastened to a bag body, for example, as shown in FIG. 10. That is to say, a belt 101 is jointed to a fastening hook 102 at an end thereof, and is connected to a bag body 103 by hooking the hook 102 with a ring-like connecting link 104 which is attached to an end of the bag body 103. The connecting hook 102 has a ring portion 105 to pass an end of the belt 101, a hook body 106 which is rotatably attached to or fixed to the ring portion 105, and a closing piece 107 to close an opening of the hook body 106 so that the hook body 106 does not come out of the connecting link 104. The closing piece 107 can elastically yield to open the hook body 106.

The above-mentioned connecting hook 102 can be easily jointed to the connecting link 104 by abutting the closing piece 107 against the connecting link 104. That is to say, when the hook 102 is pressed to the link 104, the closing piece 107 yields to open the hook body 104, and the link 104 comes into the hook body 104. However, when the hook 102 is detached from the link 104, the user must move the hook body 14 so that the link 104 comes to the curved port ion or free end of the hook body 14, for example, by pulling the hook body 14. Then, the user must push the closing piece 107 to yield it inside in order to obtain a gap through which the link 104 passes. Therefore, the detaching is very troublesome for the user, and in the actual case, after the belt is once attached, the user uses the bag with remaining jointed with the belt. As a result, such bag is used as a shoulder bag only.

SUMMARY OF THE INVENTION

A principal object of the present invention is to provide a hook device which is not only easy to joint to a link, but also easy to detach from the link. Another related object of the present invention is to provide a fastening device which is easy to connect a belt to a bag or the like and detach from the bag or the like.

According to the present invention, there is provided a hook fastener for connecting a belt, comprising a hook body having a base portion and a turned portion extending from an end of the base portion through a curved portion such that a gap is remained between the base portion and the turned portion, an engaging member housed in a hole formed in the base portion or the turned portion, and a spring member urging the engaging member such that a portion of the engaging member projects in the gap.

A preferred embodiment of the hook fastener of the present invention has a hook body having a shape of a flat plate bent at the curved portion. Further, the engaging member is preferably a ball, the hole is preferably made through the hook body, and inside periphery of the hole is preferably narrowed at the gap side so as to hold the ball. Especially, the spring member is preferably a leaf spring having a recessed portion rotatably supporting the ball, and the leaf spring is preferably fixed to the hook body at a portion thereof.

As a principal embodiment of arrangement of the leaf spring, an end of the leaf spring is fixed to an end of the hook body so that the free end of the leaf spring extends toward the curved portion of the hook body. In this case, the recessed portion is preferably formed at a position near the free end of the leaf spring. Further, the recessed portion has preferably a semi-spherical shape.

However, as another embodiment, two or more through holes may be arranged laterally at the hook body, and each ball is housed in each hole. In this case, the leaf spring may be laterally attached to the hook body at a position near the curved portion, and the center portion of the leaf spring may be fixed to the hook body. The recessed portions for rotatably housing balls may be provided at both ends of the laterally arranged leaf spring.

According to the second aspect of the present invention, there is provided a hook fastener for connecting a belt, comprising a hook body having a plate-like base portion and a pair of plate-like turned portions each of which is turned from an end of the base portion with remaining a gap, engaging members each of which is housed in a hole formed in the base portion, and a leaf spring each end of which is provided with a recessed portion for rotatably supporting the engaging member and center of which is fixed to the base portion of the hook body. In the hook fastener, the engaging member is preferably a ball.

When the above-mentioned hook fastener is hooked to a link member and the like, some resistance is caused since the link member abuts against the engaging member which projects in the gap of the hook body. Under the condition, by pulling the hook fastener further, the engaging member can be pushed in the hole by the link member. Then, the link member can be inserted deep in the gap of the main body. After the link member is inserted in the deep position of the gap, the engaging member comes out of the hole again by means of the spring member. Therefore, the link member engages with the engaging member and do not slip out even if self weight and the like is added. When the belt is hung on a shoulder of user, the weight of bag and the like can be supported by the hook body itself, since the link member is hooked by the curved portion of the hook body.

Under the situation, the engaging member do not receive any force to be depressed. When the belt is unloaded from the shoulder of user, the hook body may receive a force to pull the hook body from the link member, due to the weight of the belt. However, since the link member engages with an engaging member and the engaging member is urged by the spring member, the hook body do not come off from the link member.

When the user intends to detach the hook body from the link member, he can easily detach it by pushing the hook body in the direction of the curved portion such that the link member is pulled through the gap of the hook body. Then, the engaging member is pushed into the hole by the link member, and the hook body can be detached.

In a hook fastener in which the hook body has a shape of a bent plate, the gap between the base portion and the turned portion of the hook body is long, narrow and deep. Therefore, the hook body can securely withstand against twisting force or the like which is added to the link member or the like. Further, since the hook body can engage with the link at a long area, the belt or the like do not easily twist.

In a hook fastener in which the engaging member is a ball, the ball rotates when the ball is pushed by the link member. Therefore, the hook body can be easily attached to a bag or the like, and can be detached from the bag or the like. In a hook fastener in which the ball is supported by a recessed portion of the leaf spring, the ball is securely held and do not easily drop out, and further the ball can smoothly rotate.

In a hook fastener in which a leaf spring extends from the root portion to the top portion of the hook body, the leaf spring can yield largely. When two balls are supported by a leaf spring, a link member can be held securely.

A hook fastener which has two turned portions at both ends of the hook body, can be used to connect a ring-like link attached to a bag with another ring-like link attached to a belt, for example.

Hereinafter, preferred embodiments are explained with reference to the attached drawings.

DETAILED DESCRIPTION OF THE PRESENT INVENTION

Figure 1:
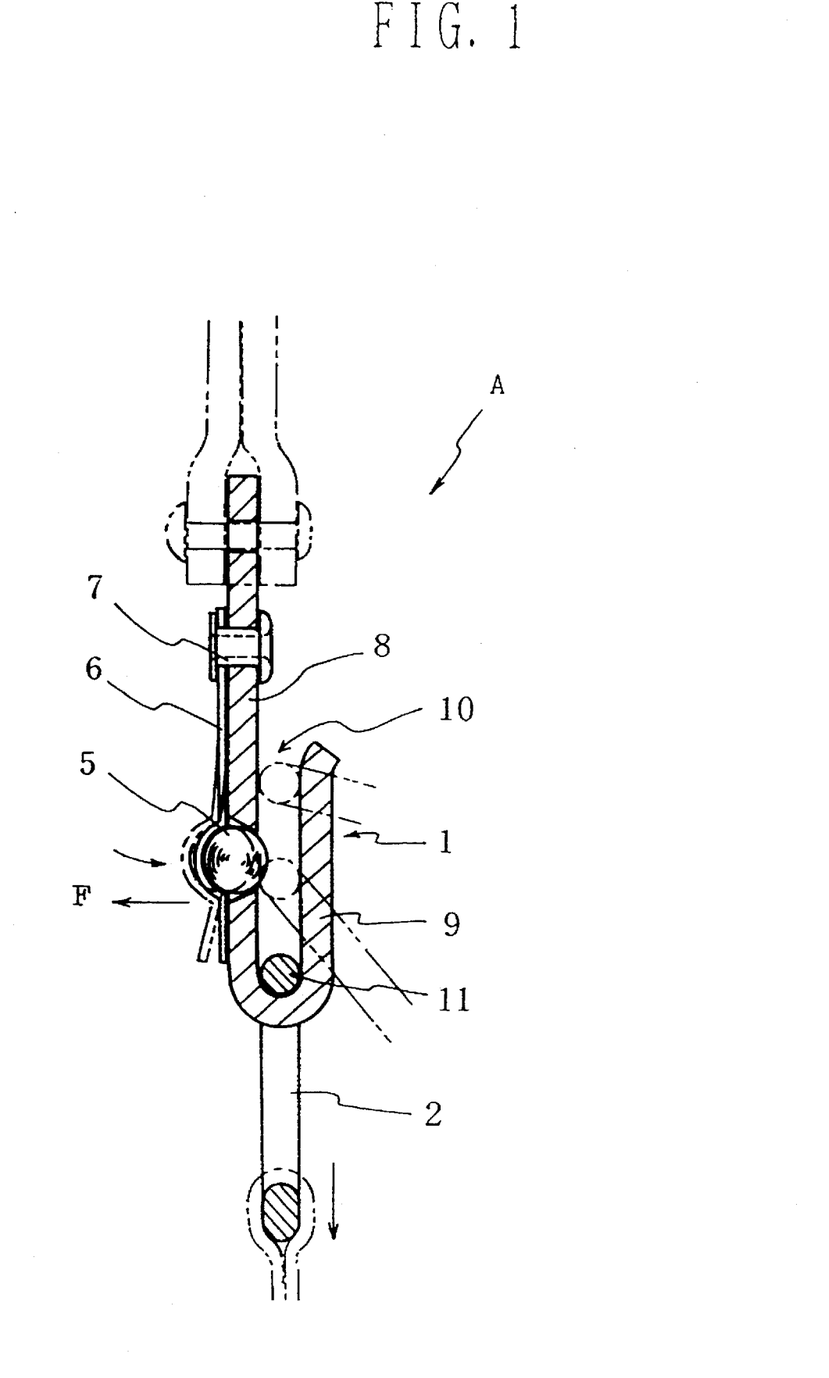
FIG. 1 is a longitudinal sectional view of an embodiment of a fastening device of the present invention.
Figure 2:
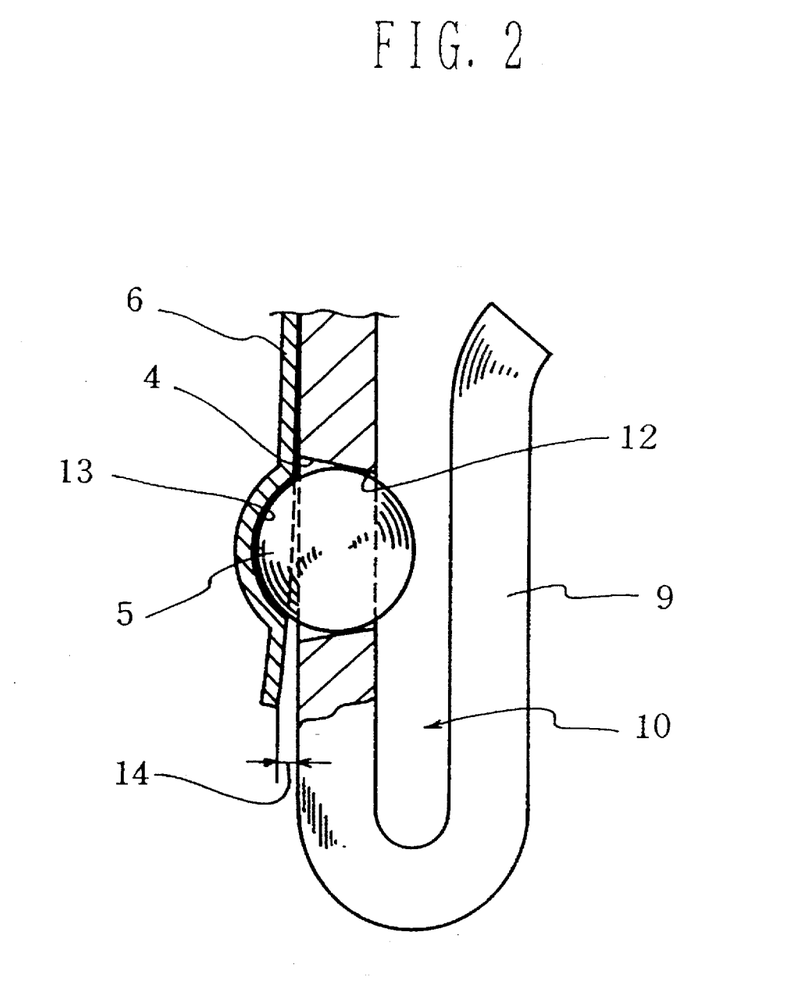
FIG. 2 is an enlarged sectional view of the hook fastener shown in FIG. 1.
Figure 3:
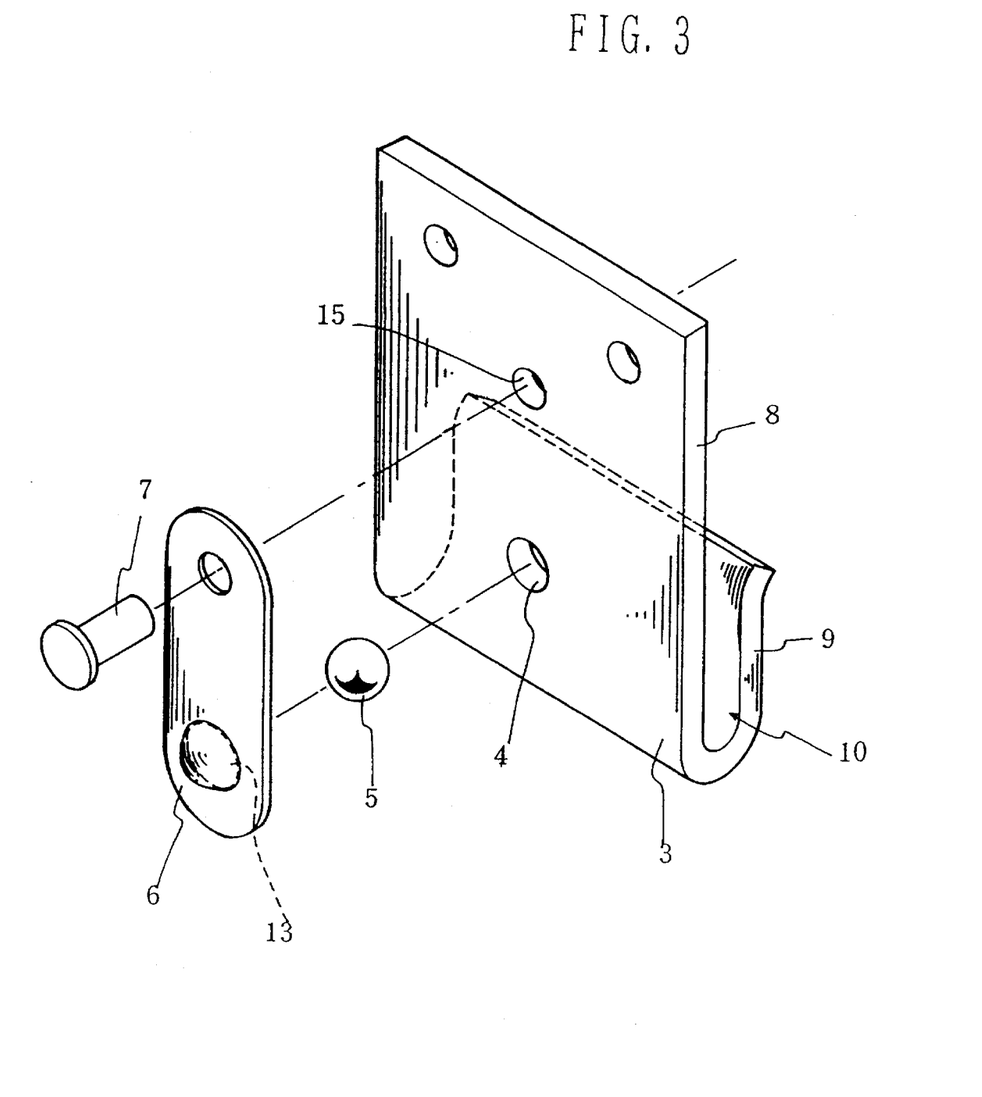
FIG. 3 is a perspective view of the hook fastener of FIG. 1 before assembly.

Referring to FIG. 1, a belt-connecting-device (fastening device) A has a ball-hook fastener or hook fastener 1 and a ring-like link 2 which is detachably jointed to the hook fastener 1. As shown in FIG. 2, the hook fastener 1 has a hook body 3 which is made by bending a flat metal plate or sheet at an end thereof so as to form a flattened J-shape. The hook body 3 has a through hole 4. The hook fastener 1 has also a ball 5 to be housed in the hole 4, a leaf spring 6 supporting the ball 5 at a back side thereof, and a rivet 7 to fix the leaf spring 6 to the hook body 3.

In detail, the hook body 3 has a base portion 8 generally extending straight and a turned portion 9 which is connected to an end of the base portion 8 through a curved portion 9a. The turned portion 9 runs substantially parallel with the base portion 8 with remaining a gap 10. The gap 10 has a width which just allows to pass the lateral bar 11 of the link 2 through it. The gap 10 between the ball 5 and the inside face of the turned portion is narrower than thickness of the lateral bar 11 of the link 2. In the present embodiment, the above-mentioned through hole 4 is formed at the base portion 8 side, and is positioned at the center in the width direction of the base portion 8. Further, as shown in FIG. 2, the through hole 4 is tapered so that an opening 12 becomes narrower at the gap 10 side. Therefore, the ball 5 is held by the inner surface of the hole 4 with projecting a part thereof from the opening 12. The hole 4 may have an annular step at the inside wall so that the diameter is narrowed at the gap 10 side opening 12. Though the hook body 3, in this embodiment, is made of a metal, the hook body may be made of a synthetic resin, especially an engineering plastic having high strength such as polyacetal, polyamide and polyimide. The ball 5 may be a steel ball usually available in market. For example, a steel ball used in a ball baring or the like is preferably employed. However, another ball such as a plastic ball may be used on demand.

The leaf spring 6 is made of a thin flat metal sheet, especially a thin long sheet made of a spring steel. The leaf spring 6 has a spherical or semi-spherical recessed portion 13. The recessed portion 13 may be formed by stamping or the like before hardening of the leaf spring 6. The depth of the recessed portion is preferably such dimension that a slight gap 14 remains between the leaf spring 6 and the surface of the hook body 3 when the ball 5 is depressed in the hole 4 as shown in FIG. 2. In such case, the ball 5 can be securely urged against the hook body 3 in an ordinal situation.

Figure 5:
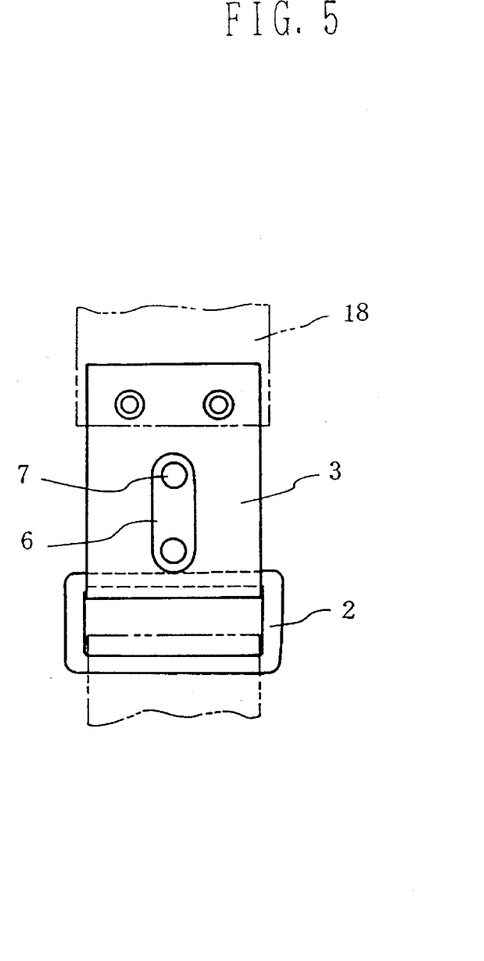

The leaf spring 6 is arranged in vertical posture at the back of the base portion 8 of the hook body 3, as shown in FIG. 5, and is fixed at the upper end by a rivet 7 which is inserted through a hole 15 of the hook body 3. If necessary, the leaf spring 6 may be fixed by two or more rivets. However, even if only one rivet 7 is used, the leaf spring 6 is not rotate around the rivet 7 since the recessed portion 13 engages with the ball 5. The leaf spring 6 may be fixed by spot welding to the hook body 3. The recessed portion 13 of the leaf spring 6 may have a conical shape instead of the spherical shape. Further, on demand, a round opening can be employed as a recessed portion. That is to say, any shape can be employed, which can hold the ball 5 from back side so that the ball 5 do not drop from the through hole 4, and which can urge the ball 5 into the hole 4. Further, a leaf spring made of synthetic resin can be employed, and moreover, a cylindrical or a conical coil spring may be used to support the ball in stead of a leaf spring. However, leaf spring is the best since the coil spring makes thick the whole thickness of the hook fastener 1, and assembling of the device becomes troublesome.

Figure 4:
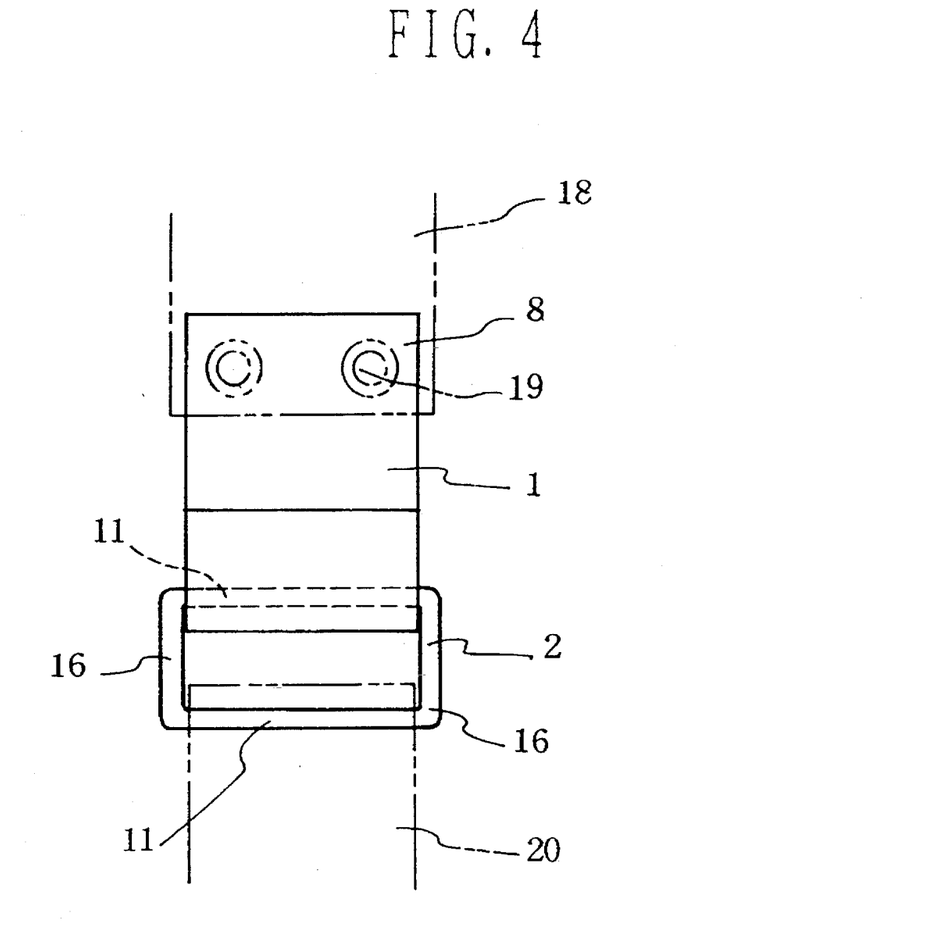
FIGS. 4 and 5 are a front view and a rear view of the fastening device of FIG. 1, respectively.

The above-mentioned connecting link 2 made of a square-shaped ring of metal wire or rod, which has two lateral bars 11 and two longitudinal bars 16, as shown in FIG. 4 and FIG. 5. The link 2 may be a common link ordinary used in a bag, day-bag, nap-sack and the like. However, the lateral bar 11 to be engaged with hook fastener has preferably a round cross section such as a circle or oval, or a cross section of square having round corners, as shown in FIG. 1, so that the lateral bar 11 can pass through the gap narrowed by the ball 5. The inside dimension of the connecting like 2 is preferably narrower a little than the width of the hook body 3.

The above-mentioned belt-connecting-device A is used, as shown in FIG. 4, by fixing an end portion of the base portion 8 by means of rivet-like members 19 to an end of a shoulder belt 18 of a shoulder bag, and by attaching the link 2 to a bag body 20 or the like. Then the shoulder belt 18 can be detachably connected to the bag body 20 by hooking the hook fastener 1 to the link 2.

When the hook fastener 1 is jointed to the link 2, as shown in FIG. 1, the free end of the turned portion 9 is inserted into the link 2 so as to insert the lateral bar 11 through the gap 10 between the turned portion 9 and the base portion 8. Then the lateral bar 11 abuts against the ball 5 and stops. However, when the hook fastener 1 is further pulled upward, side surface or slanted surface of the lateral bar 11 pushes the ball 5 into the hole 4, in the direction of arrow mark F, with yielding the leaf spring 6. That is, a projected portion of the ball 5 which projects into the gap 10 is depressed in the hole 4. Therefore, the link 4 is further inserted into the deep position of the gap 10. Of course, when the link 4 is fixed to a bag and the like, such connection is realized by moving and hooking the hook fastener 1 to the fixed link 4.

After the lateral bar 11 passes the position narrowed by the ball 5, the ball 5 projects again into the gap space 10 so as to hold the lateral bar 11. When the shoulder belt 18 of the shoulder bag is hung on the user's shoulder, the belt 18 receives tensile force. Further, the lateral bar 11 is inserted deeply in the gap 10 of the hook body 3. Therefore, there is no possibility that the hook body 3 slips off from the link 2.

However, there is some problem when the shoulder bag is unloaded from shoulder and is stood or laid on a desk or shelf. That is to say, when the shoulder bag is stood or laid, the tension of belt 18 becomes weak, and there is some probability that the weight of belt 18 and the hook fastener 1 causes to disengage the hook fastener 1 from the link 4. However, in the above-mentioned belt-connecting-device A, the ball 5 is urged by the leaf spring at a predetermined force, and the deeper the ball 5 is depressed, the stronger the ball 5 repulses. Therefore, the engagement of the link 4 with the ball 5 can sufficiently withstand against the weight (about 100 grams) of the belt 18 and the hook fastener 1. Further, in the above-mentioned embodiment, the hook body 3 do not laterally slide on the link 2, since the lateral dimension of the hook body 3 is the same as inside dimension of the link 2. Further, even if the belt 18 is twisted, the hook device 1 can be kept securely.

Figure 6A:
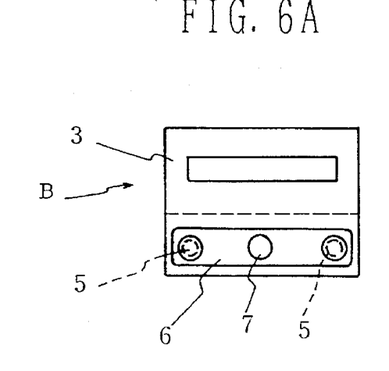
FIGS. 6a and 6b are a rear view and a side view of another embodiment of the hook fastener of the present invention, respectively.
Figure 6B:
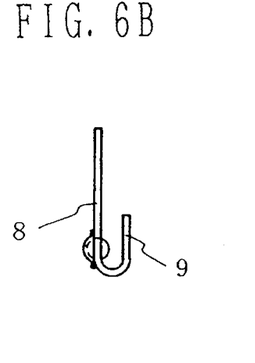

Hereinafter, with reference to FIGS. 6 to 8, another embodiments of the hook fastener of the present invention are explained. The hook fastener B shown in FIGS. 6a and 6b has a hook body having relatively wide width, and a base portion 8 of the hook body 3 has two through holes 4 at left and right sides thereof. Each ball 5 is housed in the respective hole 4. A leaf spring 6 is laterally provided on the back of the base portion 8. The leaf spring 6 is fixed to the base portion 8 of the hook body 3 at a center portion thereof, by means of a rivet 7 or the like, and both free ends of the leaf spring support the balls 5 in the holes 4. Further, the hook body 3 is provided with a laterally extending through hole or slit 21 for passing a belt at a position near the upper end thereof. When the hook fastener B is jointed to a link, the hook body do not lean on one side and do not float at one side, since two balls 5 engage with the link.

Figure 7A:
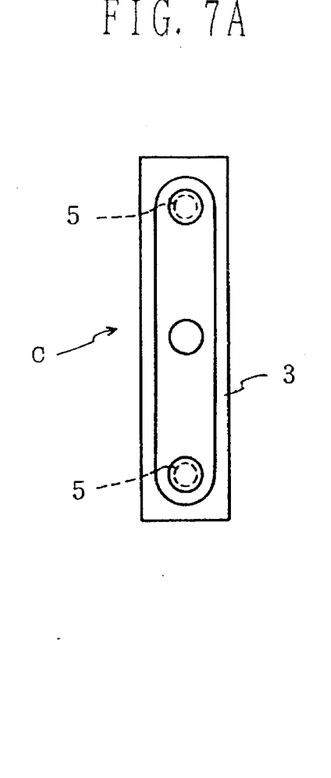
FIGS. 7a and 7b are a rear view and a side view of further another embodiment of the hook fastener of the present invention.
Figure 7B:
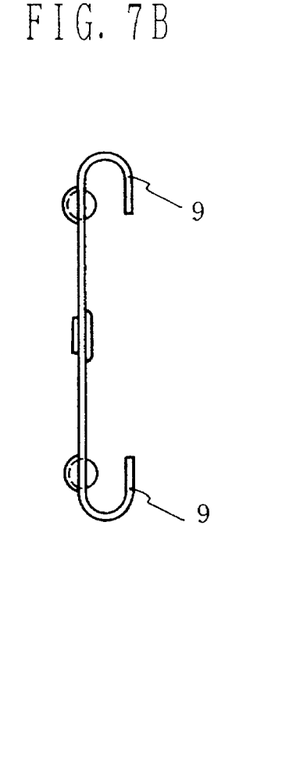

The hook fastener C shown in FIG. 7a and FIG. 7b has two turned portions 9 at the upper side and the lower side. Further, the hook body 3 has two through holes 4 at positions near the upper end and the lower end thereof, and in each hole 4, a ball 5 is housed respectively.

Further, a leaf spring 6 having the same shape as the embodiment of FIG. 6 is vertically provided on the back of the hook body 3 so as to support the two balls 5. The leaf spring 6 is fixed to the hook body 3 at the center portion thereof. The hook fastener C is used for connecting a link attached to a bag body and another link attached to an end of a shoulder belt or the like.

Figure 8:
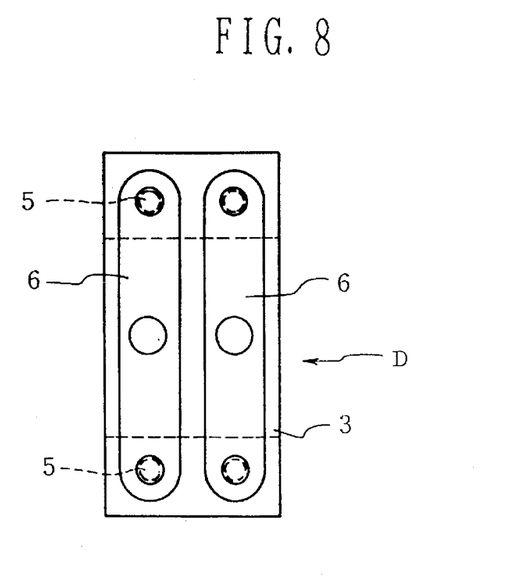
FIGS. 8 is a rear view of further another embodiment of the hook fastener of the present invention.

The hook fastener D shown in FIG. 8 has a construction where two hook fasteners C of FIG. 7 are laterally arranged and united in one body. That is to say, the hook body 3 has wide width and has upper and lower turned portions 9. Further, a combined engaging mechanisms having total four balls housed in four holes, and two leaf springs 6 supporting the balls at each free end, is employed in the embodiment.

In the present invention, another combined engaging mechanism, for example, having two turned portions and two engaging mechanism of FIG. 6 at upper and lower ends thereof can be employed.

Figure 9:
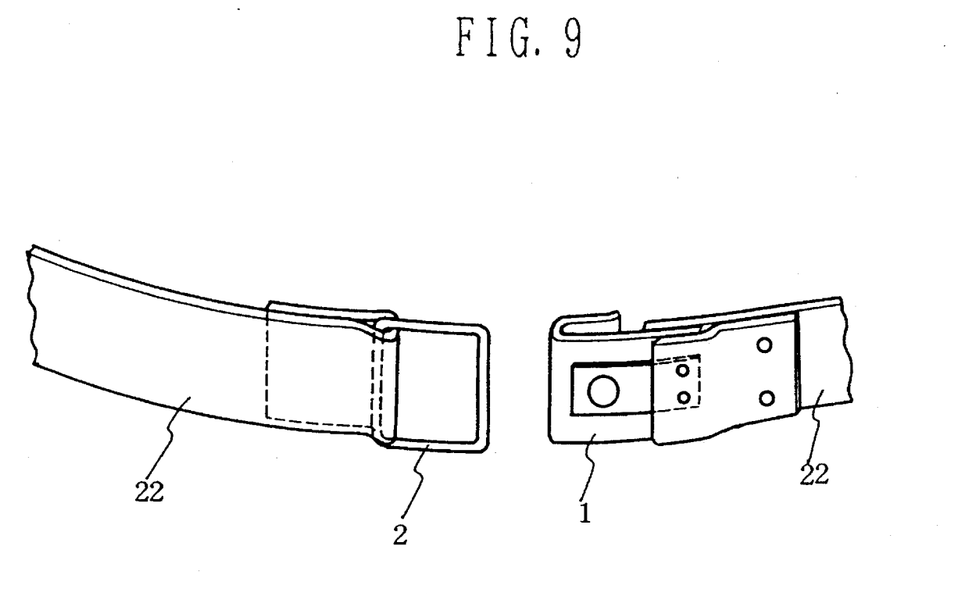
FIG. 9 is a perspective view showing a part of a belt assembly using a hook fastener of FIG. 1.

Though in the above-mentioned embodiments, ball and leaf spring are provided at the base portion side, the ball and leaf spring may be, of course, provided at the turned portion. Further, instead of the ball, a cylindrical roller may be employed as an engaging member. Further, a member having a projecting end with spherical-shape or cylindrical-shape may be directly fixed to the leaf spring, as the engaging member. Further, on demand, a portion of a leaf spring may be formed to be a projection which can be inserted in a through hole of a hook body, so that the formed portion functions as an engaging member. Those projecting end of the member and the formed portion of the leaf spring are included in the "engaging member" in the present invention. Further, though in the above-mentioned embodiments, a fastening device for connecting an end of a shoulder belt to a body of a shoulder bag is employed, the hook fastener and the belt-connecting-device can be used for a hanging belt of another articles, a back-bearing belt, a west belt 22 for a trousers or like (see FIG. 9), a wrist belt for wrist watch, a binding belt, and the like. Those devices are included in a scope of the present invention.

Though various preferable embodiments are described above with reference to the attached drawings, the present invention is not limited to the above embodiments, and various changes and modifications can be made without departing from the scope and spirit of the invention as claimed herein.

What we claim is:

1. A hook fastener for connecting a belt, comprising:

a hook body having a base portion and a turned portion extending from an end of the base portion through a curved portion such that a gap is formed between the base portion and the turned portion;

an engaging member housed in a hole formed in the base portion or the turned portion; and a spring member urging the engaging member such that a portion of the engaging member projects into the gap, wherein said engaging member is a ball;

said hole passes through the hook body; and an inside periphery around the hole is narrowed at the gap side so as to hold the ball.

2. The hook fastener of claim 1, wherein said hook body has a shape of a flat plate bent at the curved portion.

3. The hook fastener of claim 1, wherein said spring member is a leaf spring having a recessed portion rotatably supporting the ball; and the leaf spring is fixed to the hook body at a portion thereof.

4. The hook fastener of claim 3, wherein an end of the leaf spring is fixed to an end of the hook body so that a free end of the leaf spring extends toward the curved portion of the hook body; and said recessed portion is formed at a position near the free end of the leaf spring.

5. The hook fastener of claim 4, wherein two or more through holes each housing a ball are laterally arranged at the book body;

said leaf spring is laterally attached to the hook body at a position near the curved portion;

a center portion of the leaf spring is fixed to the hook body; and the leaf spring has recessed portions for rotatably supporting the balls at both ends.

6. A connecting device comprising a hook device of claim 1 and a connecting link having a lateral bar to be inserted into the gap of the hook body.

7. The connecting device of claim 6, wherein said lateral bar of the connecting link has a round or oval shape in cross-section.

8. A hook fastener for connecting a belt, comprising a hook body having a plate-like base portion and a pair of plate-like turned portions each of which is turned from an end of the base portion leaving a gap;

engaging members each of which is housed in a hole formed in the base portion; and a leaf spring each end of which is provided with a recessed portion for rotatably supporting the engaging member and center of which is fixed to the base portion of the hook body, wherein said engaging member is a ball.

9. The connecting device comprising a hook device of claim 7, and a connecting link having a lateral bar to be inserted into the gap of the body.

10. The connecting device of claim 9, wherein said lateral bar of the connecting link has a round or oval shape in cross-section.

* * * * *